United States Patent
Prasad et al.

(10) Patent No.: US 6,393,159 B1
(45) Date of Patent: May 21, 2002

(54) MULTISCALE CHARACTERIZATION AND ANALYSIS OF SHAPES

(75) Inventors: Lakshman Prasad, Los Alamos, NM (US); Ramana Rao, Sunnyvale, CA (US)

(73) Assignee: The Regents of the University of California, Los Alamos, CA (US)

( * ) Notice: Subject to any disclaimer, the term of this patent is extended or adjusted under 35 U.S.C. 154(b) by 0 days.

(21) Appl. No.: 09/345,599

(22) Filed: Jun. 29, 1999

Related U.S. Application Data

(60) Provisional application No. 60/091,096, filed on Jun. 29, 1998.

(51) Int. Cl.⁷ .............................. G06K 9/36; G06K 9/42; G06K 9/46; G06T 15/30; G06T 17/00
(52) U.S. Cl. ...................... 382/259; 382/181; 382/203; 382/204; 382/206; 382/241; 382/256; 382/257; 382/308; 345/420; 345/423
(58) Field of Search ................................. 382/181, 195, 382/203, 204, 206, 241, 254, 256, 257, 258, 259, 266, 308; 345/418, 419, 420, 423

(56) References Cited

U.S. PATENT DOCUMENTS

| | | | |
|---|---|---|---|
| 5,023,920 A | 6/1991 | Breu | 382/259 |
| 5,050,229 A | * 9/1991 | Barski et al. | 382/259 |
| 5,086,482 A | 2/1992 | Kumagai | 382/241 |
| 5,574,803 A | 11/1996 | Gaborski et al. | 382/259 |
| 5,748,865 A | 5/1998 | Yamamoto et al. | 345/423 |
| 6,133,921 A | * 10/2000 | Turkiyyah et al. | 345/420 |
| 6,134,353 A | * 10/2000 | Makram-Ebeid | 382/259 |

OTHER PUBLICATIONS

Pai, et al. "Boundary–Constrained Morphological Skeleton Minimization and Skeleton Reconstruction", IEEE, pp. 201–208,1994.*
Ogniewicz "Skeleton–Space: a Multiscale Shape Description Combining Region and Boundary Information", IEEE, pp. 746–751, 1994.*
Chew "Constrained Delaunay Triangulations", pp. 97–108, Springer 1989.*
Sheehy, et al. "Shape Description by Medial Surface Construction", IEEE, pp. 62–72, 1996.*

* cited by examiner

*Primary Examiner*—Leo Boudreau
*Assistant Examiner*—Daniel G. Mariam
(74) *Attorney, Agent, or Firm*—Ray G. Wilson

(57) ABSTRACT

An adaptive multiscale method approximates shapes with continuous or uniformly and densely sampled contours, with the purpose of sparsely and nonuniformly discretizing the boundaries of shapes at any prescribed resolution, while at the same time retaining the salient shape features at that resolution. In another aspect, a fundamental geometric filtering scheme using the Constrained Delaunay Triangulation (CDT) of polygonized shapes creates an efficient parsing of shapes into components that have semantic significance dependent only on the shapes' structure and not on their representations per se. A shape skeletonization process generalizes to sparsely discretized shapes, with the additional benefit of prunability to filter out irrelevant and morphologically insignificant features. The skeletal representation of characters of varying thickness and the elimination of insignificant and noisy spurs and branches from the skeleton greatly increases the robustness, reliability and recognition rates of character recognition algorithms.

5 Claims, 14 Drawing Sheets

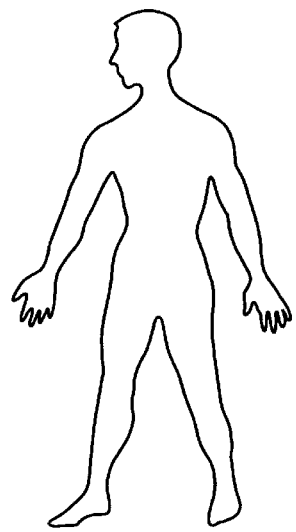
Fig. 1A
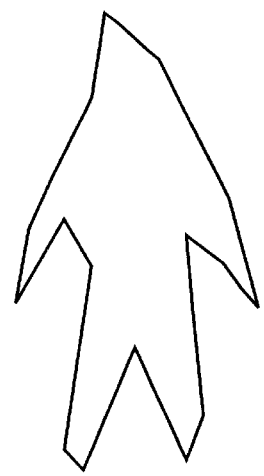
Fig. 1B
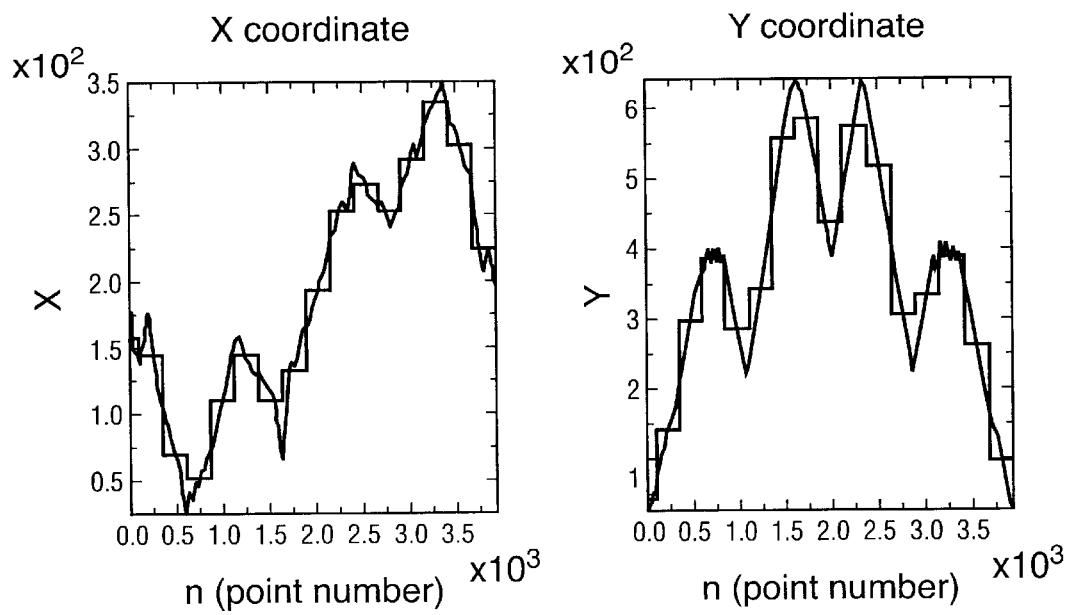
Fig. 1C  Fig. 1D

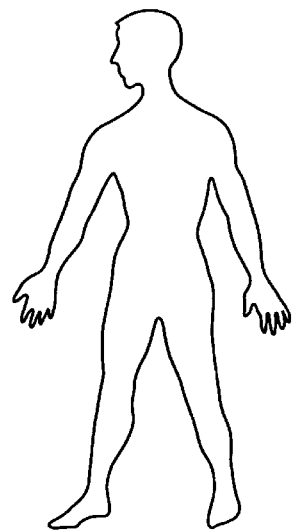
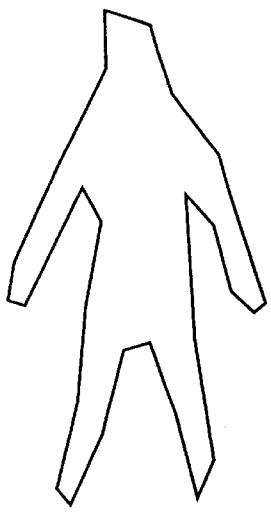
Fig. 2A  Fig. 2B
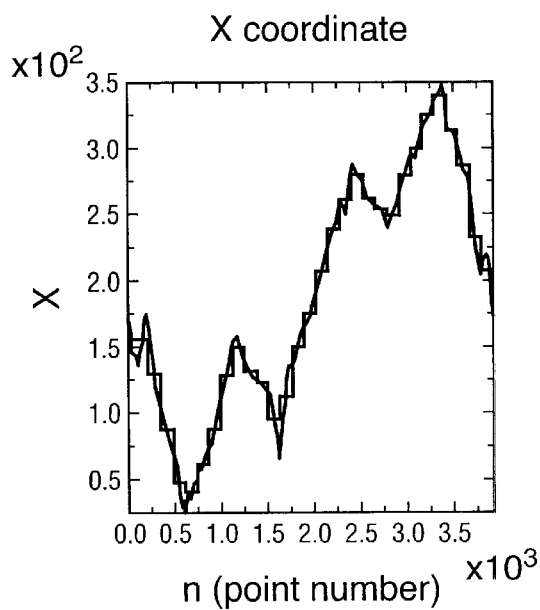
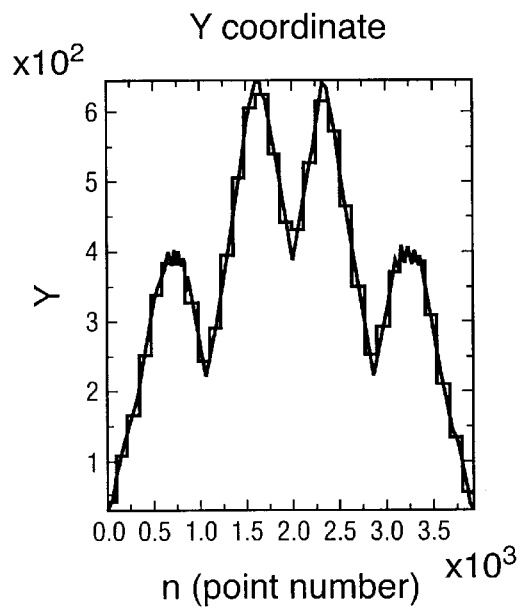
Fig. 2C  Fig. 2D

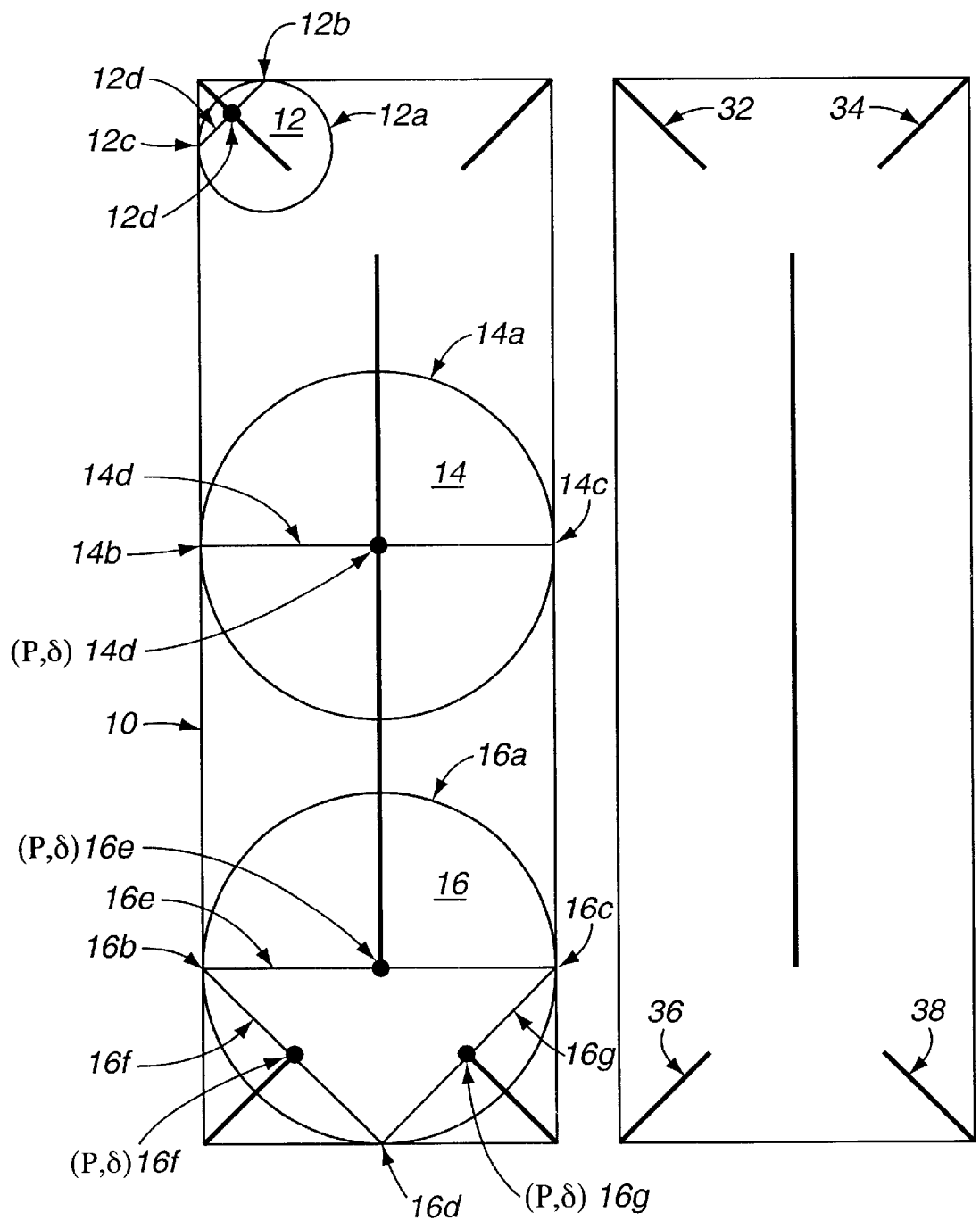
*Fig. 3A*    *Fig. 3B*

CAT versus MAT

Handwritten Letter "r"
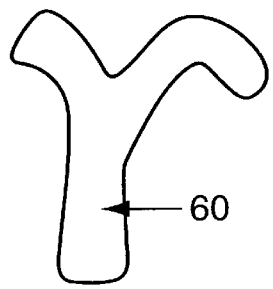
(a) Letter "r"
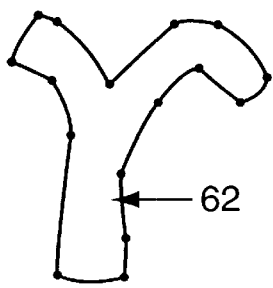
(b) Point Approximation to "r"
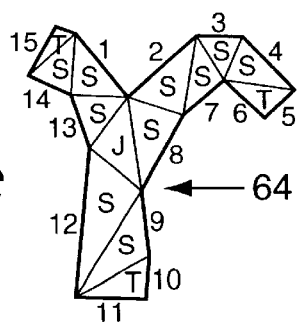
(c) Delaunay Triangulation
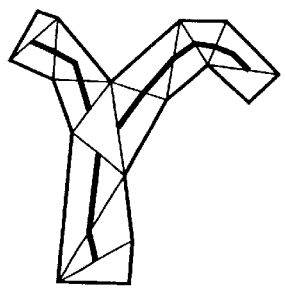
(d) Construction of Chordal Axis
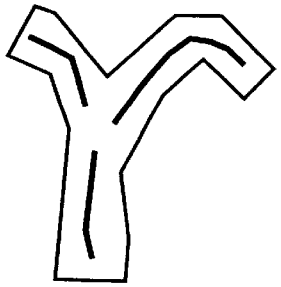
(c) Chordal Axis
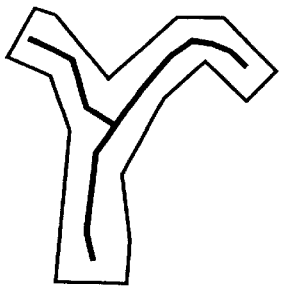
(f) Skeleton

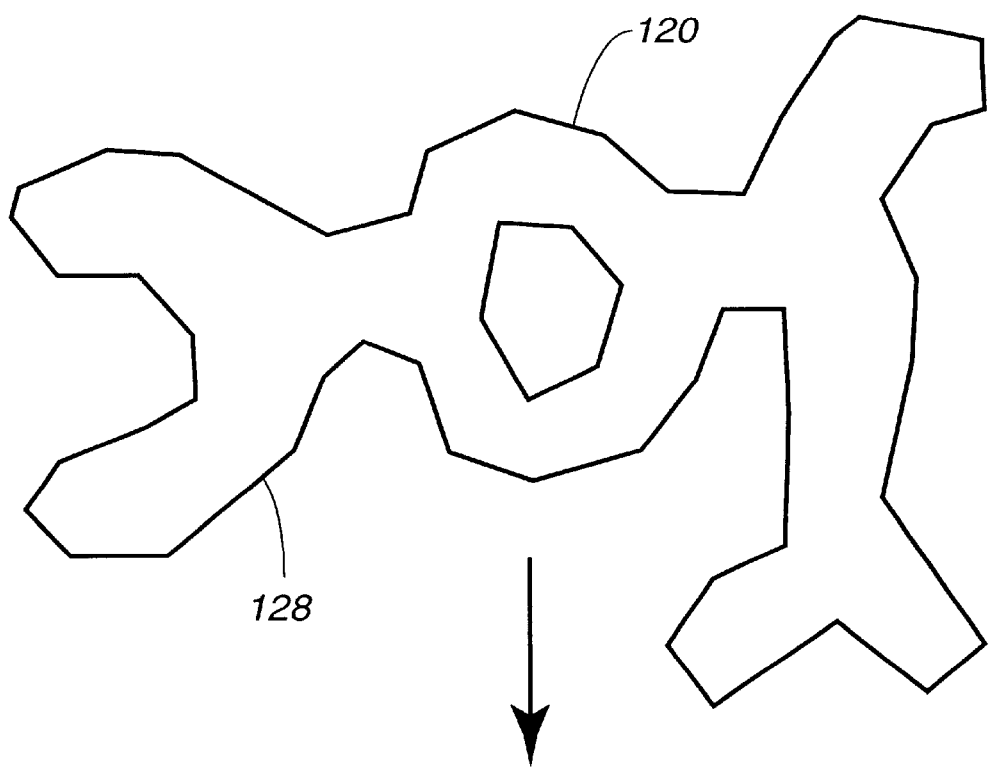
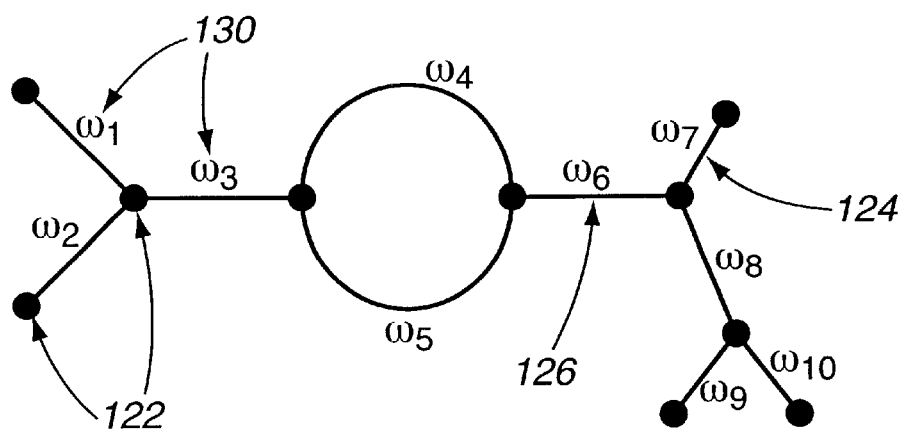
Weighted Graph
Fig. 12

MULTISCALE CHARACTERIZATION AND ANALYSIS OF SHAPES

RELATED APPLICATIONS

This application claims the benefit of U.S. Provisional Application No. 60/091,096, filed Jun. 29, 1998.

STATEMENT REGARDING FEDERAL RIGHTS

This invention was made with government support under Contract No. W-7405-ENG-36 awarded by the U.S. Department of Energy. The government has certain rights in the invention.

BACKGROUND OF THE INVENTION

This invention generally relates to the automated analysis and characterization of geometric shapes, and, more particularly, to the invertible characterization of such shapes.

The notion of "shape" is intimately related to the notion of contour or boundary. Indeed, the description of a shape entails specification of its spatial extent; that is, the specification of the shape's "inside" and "outside". This is equivalent to specifying its frontier or boundary. The boundary of a shape has, however, a continuum of points, and, as such, is not amenable to finite representation or computation.

Thus, in order to computationally characterize a shape, a discrete representation of its boundary in a morphologically faithful manner, i.e., preserving its structural integrity, is necessary. Next, the fundamental morphological attributes of the shape must be extracted from this representation. One of the important morphological descriptors of a shape is its "skeleton" (the "frame" over which the "meat" of the shape hangs).

For a shape with a continuous boundary, the medial axis (set of all interior points with two or more nearest points on the boundary) is the generally accepted definition of its skeleton. The formation of such a skeleton is described by H. Blum, A Transformation for Extracting New Descriptors of Shape, *Symposium on Models for Speech and Visual Form*, Weiant Whaten-Dunn (Ed.) (MIT Press, Cambridge, Mass., 1967), incorporated herein by reference. Though the medial axis transform (MAT) of a shape has been the generally accepted definition of its skeleton, it is widely acknowledged that the resulting skeleton is not ideal in most cases.

The MAT of a shape is the locus of the centers of all maximal discs contained in the shape. A maximal disc contained in the shape is any circle whose interior is contained completely inside the shape (i.e., has empty intersection with the exterior of the shape) such that the circle touches the boundary of the shape at two or more points. Equivalently, for every interior point of a shape, consider the set of boundary points nearest to it. The MAT of the shape is then defined by the set of all those interior points of the shape that have at least two nearest boundary points.

Strictly speaking, the locus of the centers of maximal discs is only the medial axis. The MAT includes the specification of the radii of the maximal discs along with their centers. This makes the MAT an invertible transform. Thus, the union of all discs with centers and corresponding radii specified by the MAT of a shape is the shape itself.

Further, while it is possible to obtain the MAT of a shape directly from its boundary, it is in general not possible to obtain the boundary of a shape directly by inverting its MAT; the boundary must be recovered by some other means after the shape has been reconstructed. It is important to note that the boundary of a shape is different from the shape itself, in that it is the frontier separating the shape's interior from its exterior.

The MAT is a non-local transform. This, in general, causes a small feature on the boundary of a shape to induce a skeletal feature in the MAT that is spatially far removed from the corresponding boundary feature. In addition, boundary features may be greatly exaggerated or underplayed by their skeletal counterparts. The MAT in a shape may have several small branches and spurs induced by minor undulations or noise present in the boundary. These features in the MAT do not contribute significantly to the overall structure of the shape. The MAT of a shape has information only about the distances of the boundary features of the shape and not about their "girths" or "sizes." It is therefore hard to estimate the significance of a point in the MAT to the description of the overall shape. Thus, there is no natural way to "prune" the MAT to obtain a basic skeleton that captures the essence of a shape without regard to the insignificant local boundary features.

The MAT does not extend to a discretely represented shape (e.g., in raster format). Indeed, the set of interior points with two or more nearest boundary points for a discretized shape may be an empty set. The unavailability of the MAT for computing skeletons of discretized shapes has stood in the way of its use as a practical definition of the skeleton. Consequently, there is no generally accepted definition for the skeleton of a discretized shape. There have been attempts to extend the MAT to digitized shapes; for example, the well-known class of "thinning" algorithms in image processing (e.g., see U.S. Pat. No. 5,574,803, issued Nov. 13, 1996). These attempts, however, have been computationally expensive and the resulting skeletons fall short of the requirements of an ideal skeleton. Further, many of these algorithms leave behind undesirable artifacts, such as spurs and branches, which are sometimes eliminated by further elaborate post-processing. Thus, although the MAT of a shape is regarded as its primary morphological descriptor, it has not proved to be very useful in providing computationally viable information about the structure of the shape. In summary, the existing state-of-the-art in shape characterization/analysis is either inadequate, computationally expensive, or, frequently, both.

The invention described herein broadly provides a methodology for multiscale morphological characterization and analysis of connected planar shapes and their properties. It lays down a general purpose computational setting for scale-sensitive extraction, characterization and analysis of shape features. Various objects, advantages and novel features of this invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In one aspect, the present invention is directed to a computer implemented method for determining the skeletonized representation of a shape having a boundary. A set of maximal discs is first formed within the boundary of the shape. The maximal chords of tangency are determined for each maximal disc in the set of maximal discs. The set of all ordered pairs $(p,\delta)$ of the maximal chords of tangency are determined, where p and δ are the midpoint and half the length, respectively, of each maximal chord of tangency of the maximal discs that are tangent to the shape at exactly two points. The set of unordered triples of ordered pairs of maximal chords of tangency of the maximal discs are determined that are tangent to the shape at exactly three points. The midpoints of adjacent maximal chords of tangency of the maximal discs are successively connected to form a skeletal feature that terminates at a terminal maximal chord of tangency of a maximal disc that is tangent to the shape at exactly three points. The skeletal features are connected by joining the midpoints of the maximal chords of a maximal disc with three maximal chords with the center of the maximal disc if the maximal chords form an acute angled triangle, or to the midpoint of the longest of the three chords otherwise so that a connected skeletal representation of the shape is formed.

In another aspect of the invention, a computer implemented method for determining the skeletonized representation of a shape having a boundary uses Constrained Delaunay Triangulation. A discretized multi-scale representation of a shape is first formed using a Haar wavaelet tranform. A Constrained Delaunay Triangulation (CDT) of the discretized representation is formed to define termination triangles (T-triangles) having two external edges, sleeve triangles (S-triangles) having one external edge, and junction triangles (J-triangles) having no external edges. For each S-triangle, a line segment is formed to connect the midpoints of its internal edges, wherein the line segments of adjacent S-triangles form a continuous chain of line segments that terminate at an internal edge of a T-triangle or a J-triangle. For each J-triangle, line segments are formed to connect the midpoint of each smaller triangle side to the midpoint of the longest side so that a connected skeletal representation of the shape of obtained.

In another aspect of the present invention, a computer implemented method provides for characterizing a shape. A Constrained Delauney Triangulation (CDT) representation of the shape is first formed. Each triangle of the CDT is characterized as a termination triangle (T-triangle) having two external edges, a sleeve triangle (S-triangle) having two external edges, or a junction triangle (J-triangle) having no external edges. The number of T-triangles and the number of S-triangles are then counted to completely characterize the morphological features of the CDT polygonal representation.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings:

FIGS. 1A–1D are representations of a shape with polyganization and the corresponding parametric representations of the shapes.

FIGS. 2A–2D are representations of the shape shown in FIG. 1A and resulting polyganization and parametric representations at a different scale.

FIGS. 3A and 3B illustrate the Chordal Axis Transform (CAT) of the present invention.

FIGS. 7A–7F illustrate the construction of a skeleton using CDT.

FIG. 12 illustrates the technique for forming a weighted graph to represent essential structural features and characteristics of a polygonized shape.

DETAILED DESCRIPTION

Figure 2E:
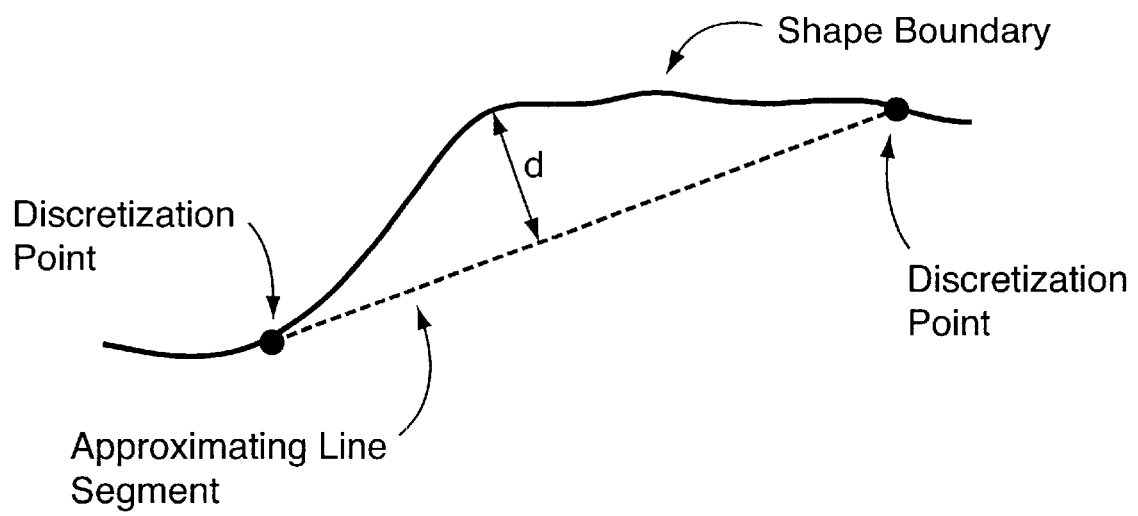
FIG. 2E illustrates a method of adaptive refinement of the scale representation of a shape.

In accordance with the present invention for the characterization and analysis of shaped, three processes are formulated. First, a multiscale technique for sparsely discretizing a continuous or densely sampled boundary of a shape is set forth. The effect of this process is to discretize and reduce the representation of the initial shape boundary to a relatively sparse sequence of points in the plane. Upon joining the adjacent points pairwise by straight line segments in the order they appear in the sequence, a polygonal approximation of the shape's boundary is obtained. The multiscale nature of this process of discretization and polygonization of shape boundary ensures that the "key" parts of the shape boundary embodying rapid changes are well captured by these discrete points while, at the same time, slowly varying parts of the boundary are sparsely but adequately characterized. Moreover, it is possible to control the overall resolution of the polygonal approximation by a single parameter. The purpose of this process of discretization is manifold. It compresses a shape's representation while maintaining its key morphological features at any prescribed scale. By discretizing a shape's continuous boundary, it renders the shape amenable to finite representation and computation. By eliminating fine insignificant variations on the boundary, it "denoises" the shape. Multiple, disjoint contours of shapes with holes are dealt with individually and separately by this process.

Next, a novel geometric shape segmentation process is set forth that serves to localize and extract shape characteristics. This process is motivated by a new transform for shapes; the Chordal Axis Transform (CAT), formulated herein, that remedies the deficiencies of the Medial Axis Transform (MAT). The generalization of the proposed transform to discretized shape boundaries leads to the formulation of this geometric segmentation process. This process enables the extraction and characterization of the morphological features of shapes. In particular it yields a method for computing the skeleton of a shape with a discretely represented contour that is invertible to recover the contour exactly. It also yields a method for excising morphologically insignificant features and simplifying shape boundary. Furthermore, it enables the explicit characterization and exhaustive enumeration of primary, semantically salient, shape features.

Finally, a process to characterize and represent a shape in terms of its morphological features is set forth. This enables the migration of a shape from its variable, syntactic and coordinate-based description to an invariant, semantic and feature-based representation in the form of weighted planar graphs.

The above outlined three processes collectively constitute this invention entitled "Multiscale Characterization and Analysis of Shapes". The extraction, abstraction, and representation of shape information are key and novel features of our invention, which establishes a computational and semantic paradigm for shape understanding.

The inadequacies and deficiencies of the Medial Axis Transform of a shape as a practical and useful descriptor of the shape's morphology has led to the formulation of a new morphological transform for shapes that is a part of the present invention. The motivation and basis for this new transform's formulation lies in the broadly desired properties of the skeleton of a shape enumerated below.

The general requirements of the skeleton of a connected planar shape are:

i) The skeleton of a connected planar shape must be a connected one-dimensional retract of the shape with the same connectivity as the shape.

ii) The skeleton must be maximally axial to the shape; i.e., it must provide the local axis of symmetry throughout the shape.

iii) The features of the skeleton must be local to the corresponding features of the shape they represent; the part of the skeleton representing a feature of a shape must "lie close" to that feature.

iv) The skeleton of a shape must be invertible; it must be possible to exactly reconstruct the shape from its skeleton. Further, since a shape is completely specified by its boundary, it must be possible to construct the skeleton of a shape directly from its boundary, and exactly recover the boundary directly from its skeleton.

v) It must be possible to manipulate the skeleton of a shape to obtain structural information about the shape at varying scales.

iv) Finally, and most importantly, the definition of the skeleton of a planar shape must naturally extend to discretized representations of the shape while satisfying all the above requirements. The skeleton of a discretized shape must approach that of the original shape as the discretization is refined to approach the original shape. Similarly, as the discrete representation of the shape gets coarser, the corresponding skeleton must degrade gracefully, while still satisfying all of the requirements listed above.

The above broad guidelines have resulted in the formulation a new morphological transform for shapes with continuous boundaries according to the present invention, called the Chordal Axis Transform (CAT). The CAT of a connected shape obtains a set of disjoint smooth arcs, each of which forms the "spine" of some "limb" or "torso" of the shape, and a set of isolated points that signify bifurcations and turns in the shape structure. The CAT thus gives a skeletal segmentation of a shape into limbs and torsos. The components of this "proto-skeleton" can then be linked in a morphologically meaningful way to obtain a connected skeleton, namely the CAT skeleton, that faithfully captures the "axis" of the shape and its structural ramifications. Furthermore, the CAT of a shape is invertible, i.e. the shape can be reconstructed from its CAT. A pruning scheme is used to trim the CAT of a shape to contain only morphologically significant branches and eliminates minor spurs due to small boundary undulations or noise.

The CAT and the CAT skeleton can both be generalized to shapes with discretized boundaries without restriction on the sparsity of discretization. This is a crucial difference from the MAT, which is not defined for arbitrary discretizations of shapes. It is this property of the CAT skeleton that makes it a practically viable and useful construct. In essence, the CAT skeleton satisfies all of the above general requirements of a skeleton of a planar shape. The process for obtaining the CAT skeleton (hereafter refered to as just "skeleton") of a shape with a discretized boundary (hereafter loosely refered to as "discretized shape" or "polygonized shape") involves the construction of the Constrained Delaunay Triangulation (CDT) of the polygonized shape's interior. Although the construction of the CDT is a well established process, it is recognized here for the first time that, when applied to the interior of a polygonal shape, it reveals important morphological information that helps characterize, recognize and analyze the shape. The Constrained Delaunay Triangulation (hereafter refered to as CDT or loosely as "Delaunay triangulation") serves as a natural morphological grid that localizes the structural properties of the shape, and yields a semantic segmentation of the shape into meaningful components. In particular, it is identified here for the first time that i) the Delaunay triangulation of a discretized shape contains three kinds of triangles, each characterizing different morphological features;

ii) it is possible to identify contiguous chains of triangles that form semantically salient shape features from the point of human visual perception, such as "limbs" and "torsos";

iii) the numbers of each kind of triangle serve to enumerate the salient morphological features of the discretized shape; namely the limb and torso structures.

iv) by making appropriate simple, local constructions within each triangle it is possible to generate a skeleton of the overall polygonized shape v) The Delaunay triangulation helps simplify and denoise shapes by providing a technique for "pruning" shapes.

In essence, the innovation claimed here is the novel use of CDT to analyze the semantics of polygonized shapes and to extract shape features.

In accordance with the present invention, a multiresolutional discretization scheme based on the Haar wavelet transform is used to adaptively discretize the boundary of a shape at varying resolutions to yield a multiscale polygonization of the shape. These discretized representations of shapes are then processed by a computationally efficient skeletonization scheme using Constrained Delaunay Triangulations of polygons. The Delaunay triangulation is also used to obtain a graph-based representation of shapes.

A detailed description of the following processes is set forth below:

i) Multiscale discretization of shape boundaries ii) Skeletonization of planar shapes with continuous boundary iii) Skeletonization of polygonized shapes iv) Shape feature analysis and enumeration using CDT v) Weighted graph representation of planar shapes Multiscale Discretization of the Boundary of a Planar Shape As used herein, the terms "planar shape" or "shape" mean a closed and bounded subset of the plane whose interior is a nonempty connected open subset, and whose boundary is a disjoint union of rectifiable simple closed Jordan curves. A simple closed Jordan curve is a connected one-dimensional subset of the plane that divides the plane into two disjoint connected open subsets that have the curve as their common boundary. A rectifiable planar curve is a continuous curve in the plane whose length can be approximated arbitrarily closely by that of a connected polygonal curve with finitely many vertices, all of which lie on the curve.

The continuous boundary of a shape can be approximated to any degree of accuracy (i.e., at any "scale" or "resolution") by a discrete sampling of its boundary points. However, a uniform sampling of the boundary does not distinguish between significant points (i.e., points that are essential to capture the overall shape), and insignificant ones. What is required is an adaptive scheme that retains the morphologically significant boundary points while eliminating the others. Furthermore, the significance of a boundary point depends upon the degree of accuracy with which the boundary is to be discretized.

Prior attempts at obtaining faithful approximations of shapes have not adequately exploited the manner in which the significance of a point, in contributing to the overall shape of the object, depends on the resolution with which the object is characterized. The significance of a boundary point depends on the level of detail desired in the discrete approximation. Conversely, different levels of detail determine different sets of significant boundary points. Wavelet transforms are used herein to naturally exploit this interdependence. See, e.g., C. K. Chui, *An Introduction to Wavelets* (Academic Press 1992) and I. Daubechies, Orthonormal Bases of Compactly Supported Wavelets, *Commun. Pure & Appl. Math.*, 41, pp. 909–996 (November 1988), both incorporated herein by reference, for the theory of wavelet transforms.

If the X and Y coordinates of the boundary points of a shape are specified parametrically (i.e., the X and Y coordinates of boundary points are specified as functions of a single intrinsic scalar parameter such as the distance along the boundary (cumulative arc length) from some reference boundary point, or the point number in the case of uniformly discretized curves), then any discretization of the boundary can be thought of as a joint piecewise constant approximation of the parametrically specified coordinate functions. The word joint is to be understood to mean that the piecewise constant approximations are simultaneously constant for the same values of the parameter for both coordinates.

The continuously varying curves (not the "staircase" curves) in FIGS. 1C and 1D show the parametric representation of the X and Y coordinates of each point in the densely sampled uniform discretization of the human shape in FIG. 1A. The staircase plots in FIGS. 1C and 1D show one possible piece-wise constant approximation of the solid line. The approximating step widths are, in general, not uniform over the entire curve; regions of the coordinate functions corresponding to gradual variations in the boundary are approximated by wide steps, whereas those corresponding to more rapid variations are approximated by narrower steps. This results in a scale-space adaptive discretization of the boundary that allocates more points to rapidly varying parts of the boundary, and fewer points to the gradually varying parts. This scale-space adaptivity can be naturally "built-in" to a discrete approximation scheme by employing Haar wavelets to obtain multiscale piecewise constant representations of the coordinate functions. This use of the Haar wavelet transform for the shape approximation process described here, and readily implemented on a computer, is one innovation of the present invention.

If the X and Y coordinate values given by the approximating staircase functions are jointly plotted in the plane, a sparse, nonuniform, scale-space adaptive discretization of the original densely sampled boundary is obtained. The approximating point corresponding to each constant span in the coordinates' approximation does not in general lie on the original boundary curve. To remedy this, the approximating point is reassigned the coordinates of the nearest point on the section of the original boundary corresponding to the constant span.

On joining these points pairwise in sequence by straight line segments, a coarse polygonal approximation of the human shape in FIG. 1A is obtained, as shown in FIG. 1B. The sixteen steps in each coordinate function in FIGS. 1C and 1D correspond to the sixteen vertices in the coarse approximating polygon in FIG. 1B. This approximation can be adaptively refined by selectively decreasing the width of the steps in the staircase functions. Since no refinement is necessary where the approximation is considered acceptable, this algorithm can be made adaptive—i.e., an approximation at a certain "scale" of resolution (e.g. FIG. 1C) need only be refined where necessary to yield an approximation at a finer scale of resolution (FIG. 2C).

One possible method of adaptive refinement is illustrated in FIG. 2E. When the ratio of the maximum perpendicular distance ('d' in FIG. 2E) of the (shorter) section of the original boundary subtended by an approximating line segment to the length of the approximating line segment exceeds a user-specified threshold, the constant spans corresponding to the end points of this line segment are jointly refined by breaking each span into two equal halves. This results in the insertion of two additional approximating points to the discrete approximation.

This threshold is a single scalar parameter that is halved with each successive refinement in the scale of approximation. In this manner, it is possible to efficiently and adaptively arrive at as precise an approximation of the original curve as desired, while at the same time minimizing the number of points required to capture the shape at the desired resolution (specified by the threshold parameter).

The coarse polygonal approximation in FIG. 1B of the shape in FIG. 1A is obtained using the discrete Haar wavelet transform as follows. First, the boundary of the shape shown in FIG. 1A is discretely and evenly sampled at the highest desired resolution to yield a parametric description of the shape contour: $\{(X[n], Y[n]), n=0, \ldots, N-1\}$, where n is the point number (in the sequential numbering of the points of the boundary) of the contour point $p_n=(X[n], Y[n])$. Next, the X and Y coordinate functions are initially approximated at a sufficiently coarse scale (determined, say, by the least number of points required in the discretization,) by step functions using the discrete Haar wavelet transform, as shown in FIGS. 1C and 1D. Using the refinement strategy described above, each span of this coarse approximation is either further refined or left as it is, to yield a joint, adaptive, multiscale, piecewise constant approximation of the coordinate functions. Alternately, one can also obtain the full discrete Haar wavelet decomposition of the coordinate functions first, and, subsequently, jointly discard the finer scale wavelet coefficients until the relative distance threshold criterion described above is violated.

FIG. 2B is the shape shown in FIG. 1A (same as FIG. 2A) (3934 points), represented at a finer approximation (31 points) than FIG. 1B (16 points). The corresponding coordinate Haar wavelet approximations are shown in FIG. 2C and 2D. The computational complexity of this approximation algorithm is linear in the number of points of the original evenly discretized boundary.

The description of the computation of the Haar wavelet transform of a discrete sequence of numbers is not described here as this is not part of the claimed invention. Appropriate references are provided above for the general theory of wavelet transforms. However, the key reasons why Haar transforms, in particular, provide a natural, multiscale, adaptive discretization of shape boundaries are enumerated below.

i) Haar wavelet transforms are localized multiscale transforms that decompose and represent functions in terms of their local transitions and trends.

ii) Haar wavelets are orthogonal bases for representing functions that have no redundancy in representation of information in scale as well as space; this allows for complete and efficient scale-space filtering of unwanted information.

iii) Haar wavelets are the only orthogonal wavelets that are also biorthogonal; this enables the decomposition of discrete functions that have arbitrary number of samples (instead of powers of 2 for all other orthogonal wavelets) without compromising the nonredundancy in information across scales in the decomposition (this is not true for other biorthogonal wavelets in general).

iv) Haar wavelets are piecewise constant functions which makes them naturally suited for curve discretization.

In summary, a piecewise constant approximation scheme that is scale-adapted to the local variations of the coordinate functions is the best method of discretely approximating the continuous boundary of a shape. Such a scheme results in a discretization that is morphologically faithful and computationally economical.

Skeletonization—The Chordal Axis Transform

With reference to FIGS. 3A and 3B, consider any planar shape, such as rectangle 10. Recall that a maximal disc inscribed in a shape is any circle, 12a, 14a, 16a along with its interior points which is completely contained within the shape and which touches the boundary of the shape at two or more points (12b, 12c), (14b, 14c), (16b, 16c, 16d).

Definition 1: A maximal chord of tangency 12d, 14d, 16e, 16f, 16g of a maximal disc is a chord of the bounding circle of a maximal disc, such that i) it connects two points of tangency of the maximal disc with the boundary of the shape, and ii) at least one of the two arcs of the bounding circle subtended by the chord is free of points of tangency with the shape's boundary.

With this definition, a new morphological transform of a planar shape, called the Chordal Axis Transform, is created. This transform is defined here for "non-degenerate" shapes; that is, for shapes whose maximal discs touch their boundaries at no more than three points. For instance, circles and regular polygons with four or more sides are degenerate shapes. This definition is not intended to be limiting since the transform can accommodate degenerate shapes with obvious minimal and minor changes to its definition.

Definition 2: The Chordal Axis Transform (CAT) of a non-degenerate planar shape consists of i. the set of all ordered pairs (without repetition) (p,δ), where p and δ are the midpoint and half the length, respectively, of a maximal chord of tangency of a maximal disc tangent to the shape at exactly two points, along with ii. the set of all unordered triples $\{(p_1,\delta_1),(p_2,\delta_2),(p_3,\delta_3)\}$ of ordered pairs, where $p_i$ and $\delta_i$ (i=1,2,3) are the ordered pairs of maximal chords of tangency of a maximal disc tangent to the shape at exactly three points.

Henceforth, unless otherwise specified, the word chord will be used to loosely refer to a maximal chord of tangency. The definition of a CAT is partially motivated by the need to extract the axes and centers of local symmetries of shapes. The CAT is, in fact, a close relative of the MAT. Indeed, the MAT can be formally defined as follows:

Definition 3: The Medial Axis of Transform (MAT) of a planar shape is the set of all ordered pairs (p,δ), where p and δ are the center and radius of a maximal disc contained in the shape.

Figures 4A, 4B:
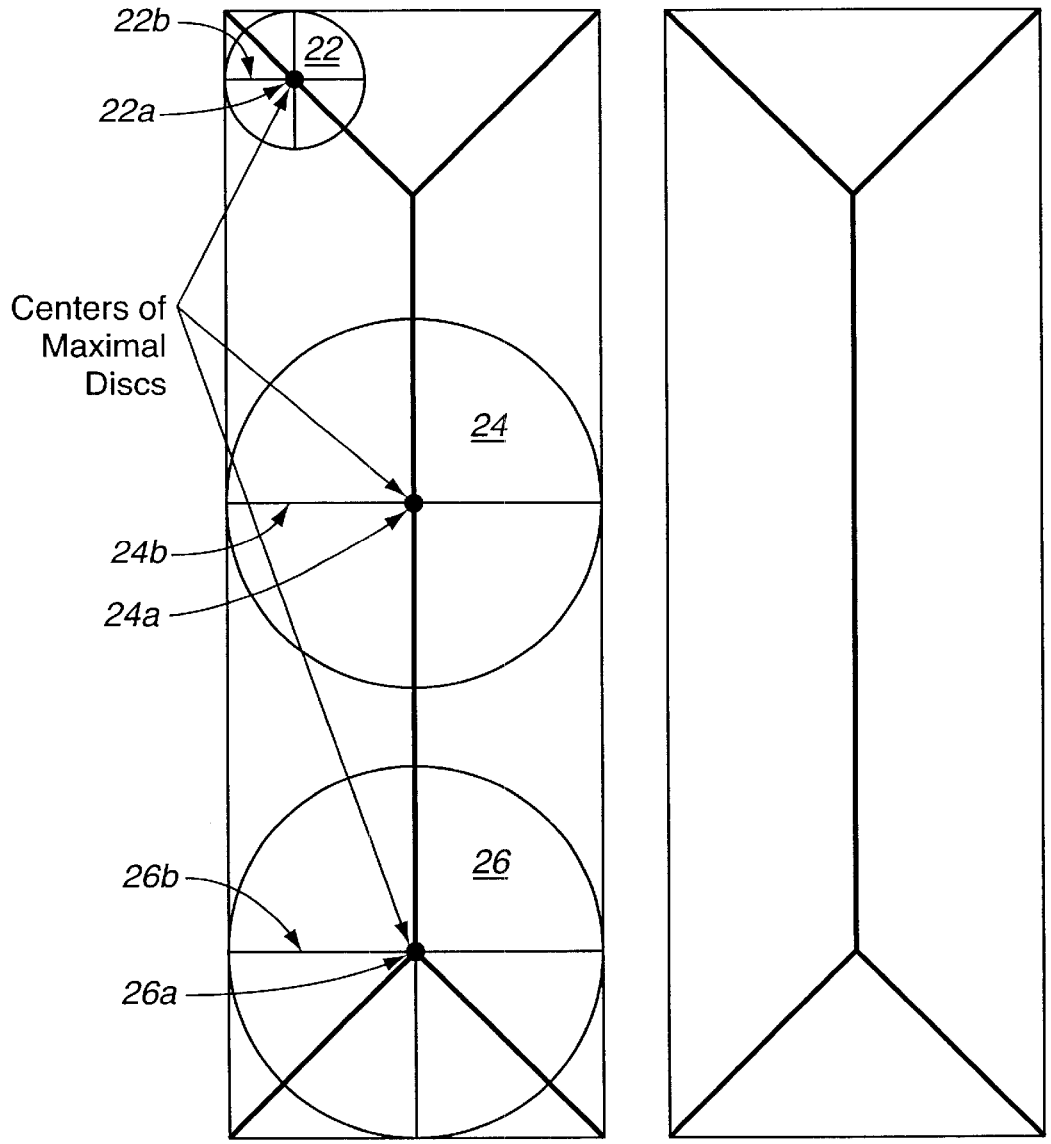
FIGS. 4A and 4B illustrate the prior art Medial Axis Transform (MAT) to skeletonize a shape.

The MAT, shown in FIGS. 4A and 4B, the midpoints 22a, 24a and 26a of diameters (i.e., centers of maximal discs 22, 24, and 26), together with half the lengths of diameters (i.e., radii 22b, 24b, and 26b) constitute the complete transform. The CAT, by comparison, is the set of midpoints of chords 12d, 14d, 16e, 16f, and 16g (FIG. 3A) along with half the lengths of these chords of maximal discs. The CAT's use of midpoints and half-widths of chords, as against the MAT's use of the centers and radii of maximal discs, is crucial to its superior performance and versatility.

The locus of points constituting the MAT of a connected shape forms a connected set (the shape's medial axis skeleton) shown in FIG. 4B, whereas the locus of points constituting its CAT is, in general, a disconnected set (the shape's chordal axis protoskeleton) shown in FIG. 3B.

The points of a shape's CAT in the plane form a protoskeleton, consisting of: i) contiguous arcs that correspond to axes of local axial symmetry of "limbs" and "torsos" of the shape (see FIG. 3B arcs 32, 34, 36, and 38), and ii) isolated points that correspond to branch-points and bend-points of the shape's ramifications. The CAT of a shape thus yields a feature-based segmentation of the shape's skeleton. This property of the CAT makes it possible to easily excise unwanted or inconsequential branches and spurs due to noise and other micro-features of the boundary of a shape that do not determine its essential structure.

A connected skeleton of a shape can be obtained from its CAT by joining the midpoints of the chords of maximal discs which have three chords of tangency to the center of the maximal disc if the chords form an acute angled triangle (see FIGS. 3A and 3B), or to the midpoint of the longest of the three chords, otherwise. The resulting skeleton has the same connectivity as the shape.

Each of the contiguous arcs of a shape's CAT (see, e.g., arcs 36, and 38) that correspond to a limb or a torso of the shape terminates in the midpoint (e.g., $(p,\delta)_{16f}$, $(p,\delta)_{16g}$) of a chord (e.g., chords 16f, 16g respectively) of a maximal disc (e.g., disc 16) with three chords. By simply choosing not to connect the midpoint of the terminal chord to the center (or the midpoint of the longest chord) of the maximal disc, and by eliminating the points of the arc, the arc may be excised from the skeleton of the shape. In this fashion, arcs that are not significant to the CAT skeleton, at a particular scale, may be removed. Thus, the CAT of a shape can be manipulated to retain only relevant or salient structural information about the shape at various scales.

The points of arcs of the CAT serve as "instantaneous axes" of local axial symmetries of the shape. Therefore, the skeleton obtained from the CAT is maximally axial in this sense.

Figure 5:
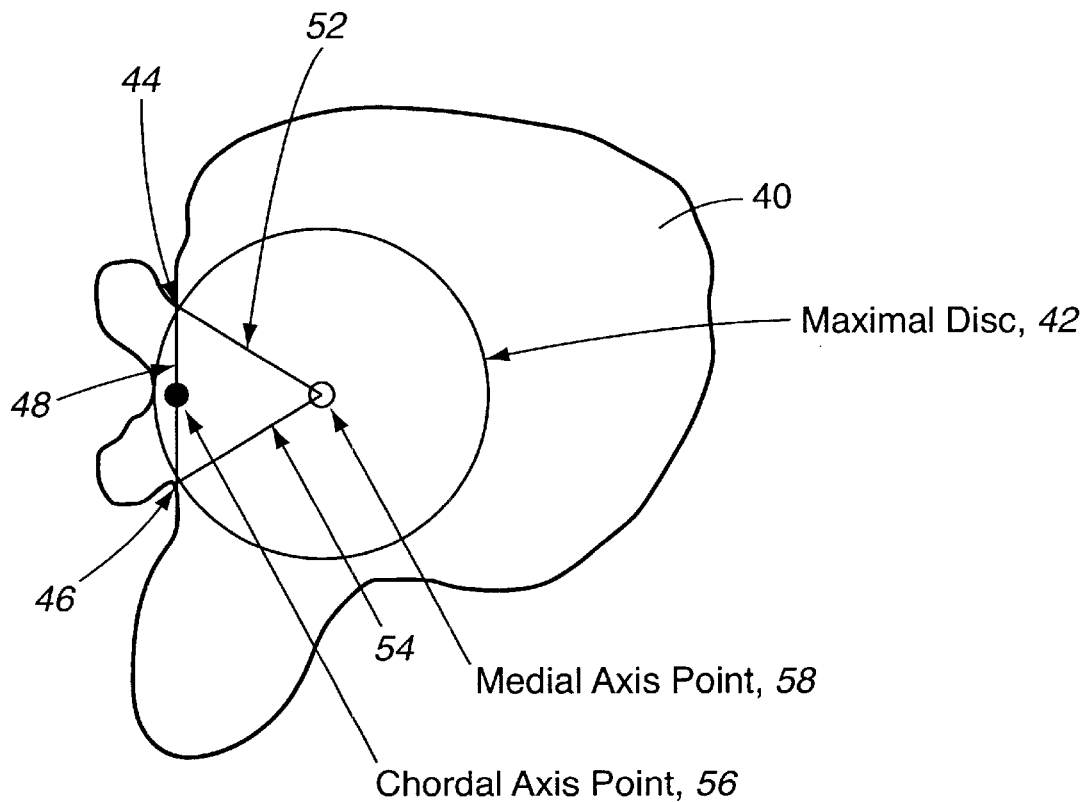
FIG. 5 illustrates some differences between a CAT and a MAT to represent local features of a shape.

The CAT is a local transform, whereas the MAT is not, as shown by FIG. 5. Each point 56 of the CAT of a shape 40 that is the midpoint of a chord 48 is induced by two points 44, 46 on the boundary of shape 40. A pair of boundary points 44, 46 of shape 40 that induces a point 56 of the shape's CAT will henceforth be called a span. The CAT of a span is the ordered pair (p,δ), where p is the midpoint 56 of the line segment 48 joining the points 44, 46 of the span, and δ is half the distance between the span points. As a result, the CAT of a span is completely determined and localized by the span, and not by any other boundary points.

For each point of the CAT of a shape, there is a unique span, and conversely, for each span, there is only one point of the shape's CAT. In contrast, each point 58 of the MAT of a nondegenerate shape may be induced by two or three boundary points. Recall that the points of the MAT are centers of maximal discs, e.g., disc 42. If a point of the MAT of a shape is the center of a maximal disc that touches the boundary of the shape at exactly three points, then there are infinitely many points of the MAT that are centers of maximal discs touching any two of these three points. While there is a one-to-one correspondence between maximal discs and MAT points of a shape, there is no such correspondence between boundary point sets, e.g., points 44, 46 of the shape inducing MAT points and the MAT points of the shape. The location of a MAT point is, in general, not determined by the locations of its inducing boundary points alone, but often depends upon the nonlocal structure of the shape itself. In FIG. 5, note the distance between the boundary of shape 40 that induces MAT point 58 and MAT point 58.

The CAT of a shape is strongly invertible, in that the boundary of a shape can be directly recovered from its CAT. This is, however, not true of the MAT, as observed earlier. For a nondegenerate shape, the boundary of the shape can in fact be recovered from the nonisolated points of the CAT alone.

The CAT Inversion Algorithm

The contiguous arcs of the CAT are smooth, i.e., a unique tangent to the arc can always be drawn at each point of the arc. This is a direct consequence of the fact that the chords corresponding to different spans of a shape cannot intersect at points other than their end points. If the CAT of a span belongs to a contiguous arc of the CAT of a shape, then the chord of the span intersects the arc orthogonally at the CAT point of the span. Therefore, for each point $(p, \delta)$ of the arc, the end points of the line segment of length $2\delta$ centered at p, and perpendicular to the arc at p, yields its span. For a nondegenerate shape, each boundary point belongs to a span, whose CAT is a nonisolated point belonging to an arc of the shape's CAT. Thus, the boundary of a shape can be directly obtained from its CAT's nonisolated points $(p, \delta)$ by identifying the spans of all the nonisolated CAT points. It is clearly possible, in particular, to recover only those boundary points that correspond to certain select nonisolated points of the CAT without having to recover other boundary points. Thus, the CAT is strongly and locally invertible to obtain the whole or partial contour of a shape. The CAT skeleton satisfies the first five requirements of a skeleton, set out above. The CAT approach extends to discretized shapes and provides skeletons of discretized shapes that satisfy the final requirement of skeletons.

The Discrete CAT

When a shape is discretized, its boundary is sampled at discrete points, and neighboring sampled boundary points are joined by straight line segments. This results in a "polygonal" approximation of the shape. The interior and exterior or the shape are approximated by the interior and exterior of the polygonal approximation. However, interior points of the line segments joining neighboring sample points are not considered as part of the boundary of the discretized shape.

This is an important distinction. The polygonal approximation is still considered to have only the discretely sampled boundary points of the shape as its boundary points. The boundary of the shape is discretely approximated, but not interpolated, by a polygon. In other words, the lack or loss of boundary information between two neighboring discrete boundary points cannot be faithfully interpolated by the line segment joining the two points.

Figure 9:
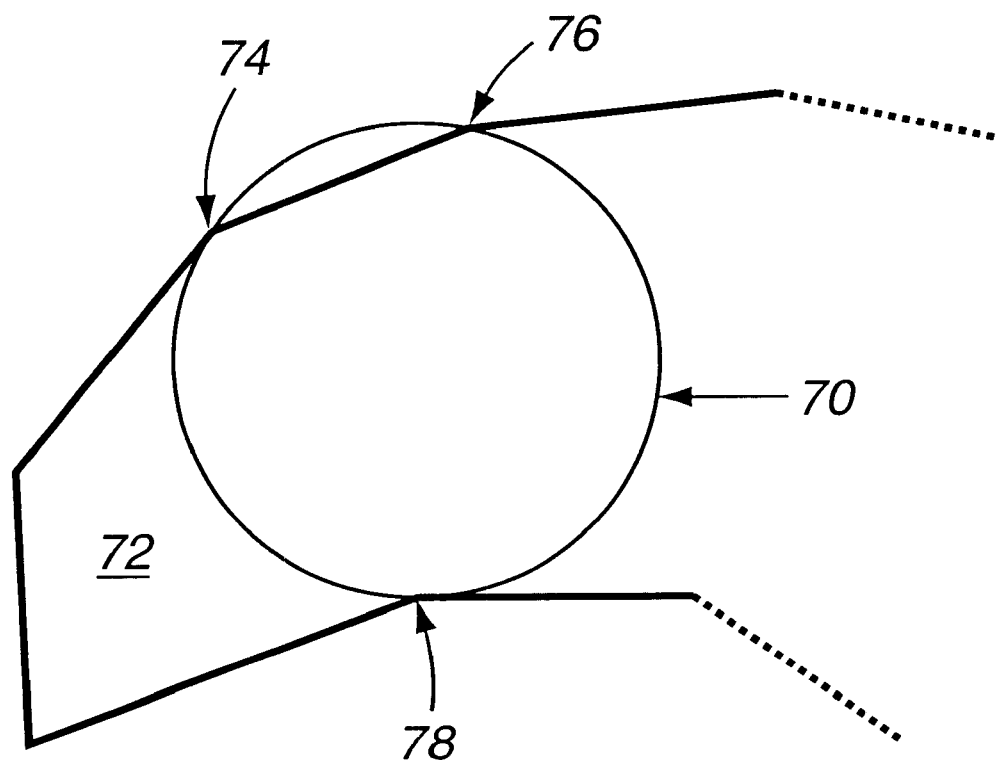
FIG. 9 illustrates the role of maximal discs in forming the CAT of a discretized representation of a shape.
Figure 10:
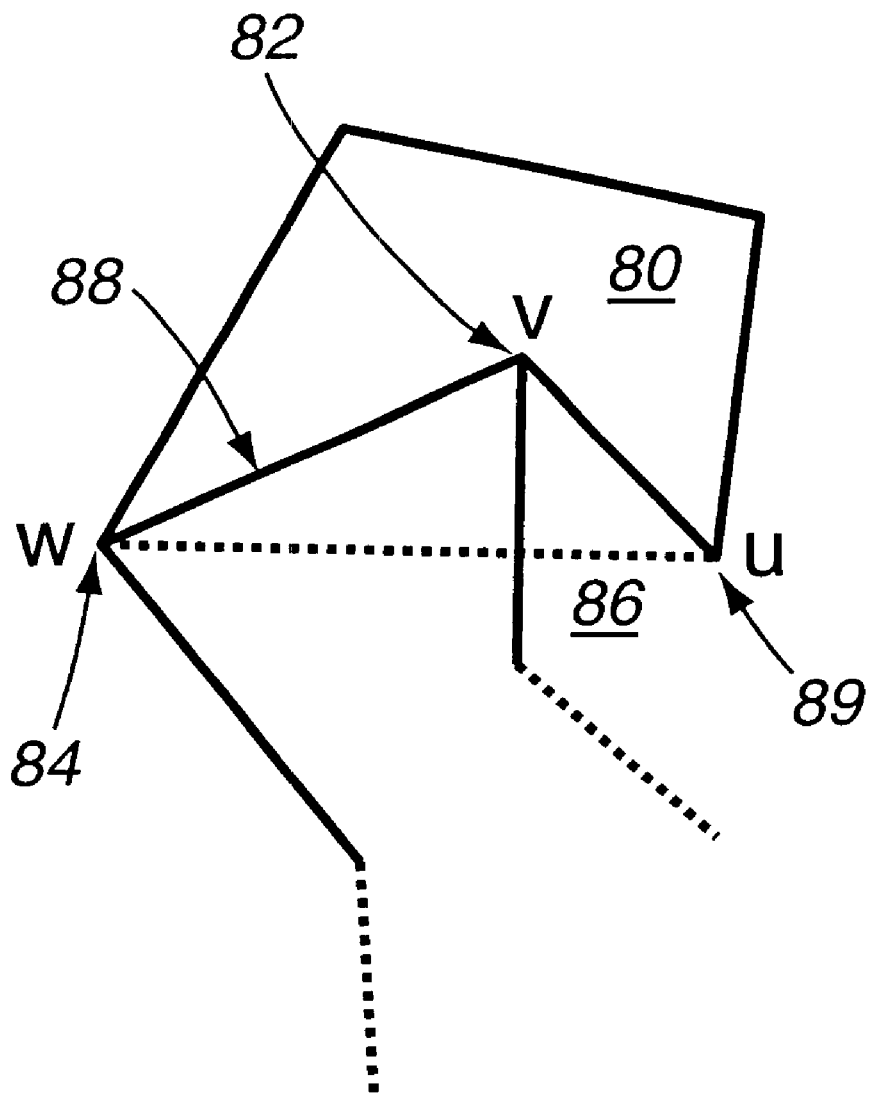
FIG. 10 illustrates the concept of visible vertices.

The CAT of such discretization of a shape can, however, still be defined. In this case, the role of maximal discs are played by circles 70 that pass through at least three vertices 74, 76, 78 of the polygon, as shown by FIG. 9. These circles have the additional requirement that they do not contain in their interior any vertex of the polygon that is visible to two vertices on the circle. As seen in FIG. 10, two vertices v 82 and w 84 of a simple polygon 80 are visible to each other if the line segment 88 joining v and w does not intersect the exterior 86 of the polygon. Such circles are called empty circles. Note that vertices w 84 and u 89 are not visible to each other. Again, it is assumed here that no four vertices of the approximating polygon are co-circular. Therefore, each empty circle of the polygon has exactly three vertices on it. The "degenerate" case when four or more points are co-circular is handled easily with minor modifications.

The equivalents of maximal chords of tangency for the discrete case are then obtained by joining two non-neighboring vertices of the approximating polygon if and only if an empty circle passes through both these vertices. This results in a triangulation of the interior of the polygon called its Constrained Delaunay Triangulation (CDT).

Definition 4: The Constrained Delaunay Triangulation of a simple polygon (i.e., a polygon whose boundary does not intersect itself) is a decomposition of a polygon into triangles, such that the circumcircle of each triangle contains no vertex of the polygon inside it that is simultaneously visible to two vertices of the triangle.

The CDT of a polygonal region is not a new construct, and has been used elsewhere before for grid generation to numerically solve differential equations with boundary conditions. Here, however, for the first time, it is used in a novel way to reveal and analyze the semantics and structure of shapes.

Figure 6A:
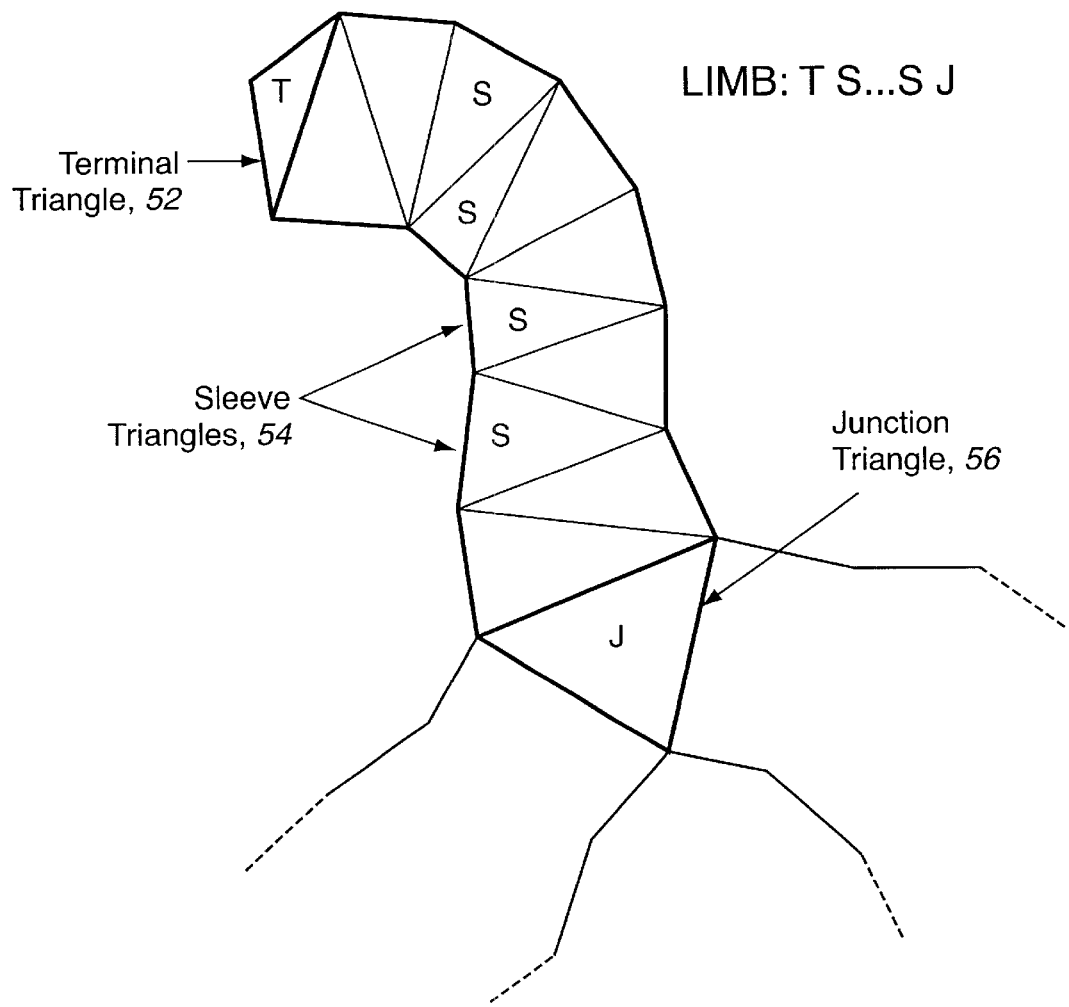
FIGS. 6A and 6B illustrate Constrained Delaunay Triangulation (CDT) of a shape.

The triangles of a polygon's CDT can be classified into three types, namely those with two external (i.e., polygonal boundary) edges, those with one external edge, and those with no external edges. Each kind of triangle carries morphological information about the local structure of the polygon. Accordingly, they are given different names as illustrated in FIG. 6A. A triangle with two external edges marks the termination of a "limb" or a protrusion of the polygon and is called a termination triangle or a T-triangle 52. A triangle with one external edge constitutes the "sleeve" of a "limb" or protrusion, signifying the prolongation of the shape, and is called a sleeve triangle or S-triangle 54. Finally, a triangle that has no external edges determines a junction or a branching of the polygon, and will accordingly be called a junction triangle or a J-triangle 56.

In any triangulation of a simple polygon, the number $\Delta J$ of J-triangles is related to the number $\Delta T$ of T-triangles by $$\Delta J = \Delta T + 2g - 2$$

where g is the number of holes (i.e., the genus) of the polygon.

The terms "limb" and "torso" have been loosely and suggestively used above thus far. These terms are formalized below to identify key morphological structures of polygonized shapes. To this effect, two kinds of chain complexes of triangles are identified in any triangulation of a polygon:

Definition 4: A limb $\lambda$ is a chain complex of pairwise adjacent triangles of the form TS . . . SJ or JS . . . ST. (See FIG. 6A)

Here, J, T, and S each symbolize a junction, a terminal, and a sleeve triangle, respectively. The number of sleeve triangles in a limb is allowed to be zero; thus, the duos JT or TJ also define limbs.

Figure 6B:
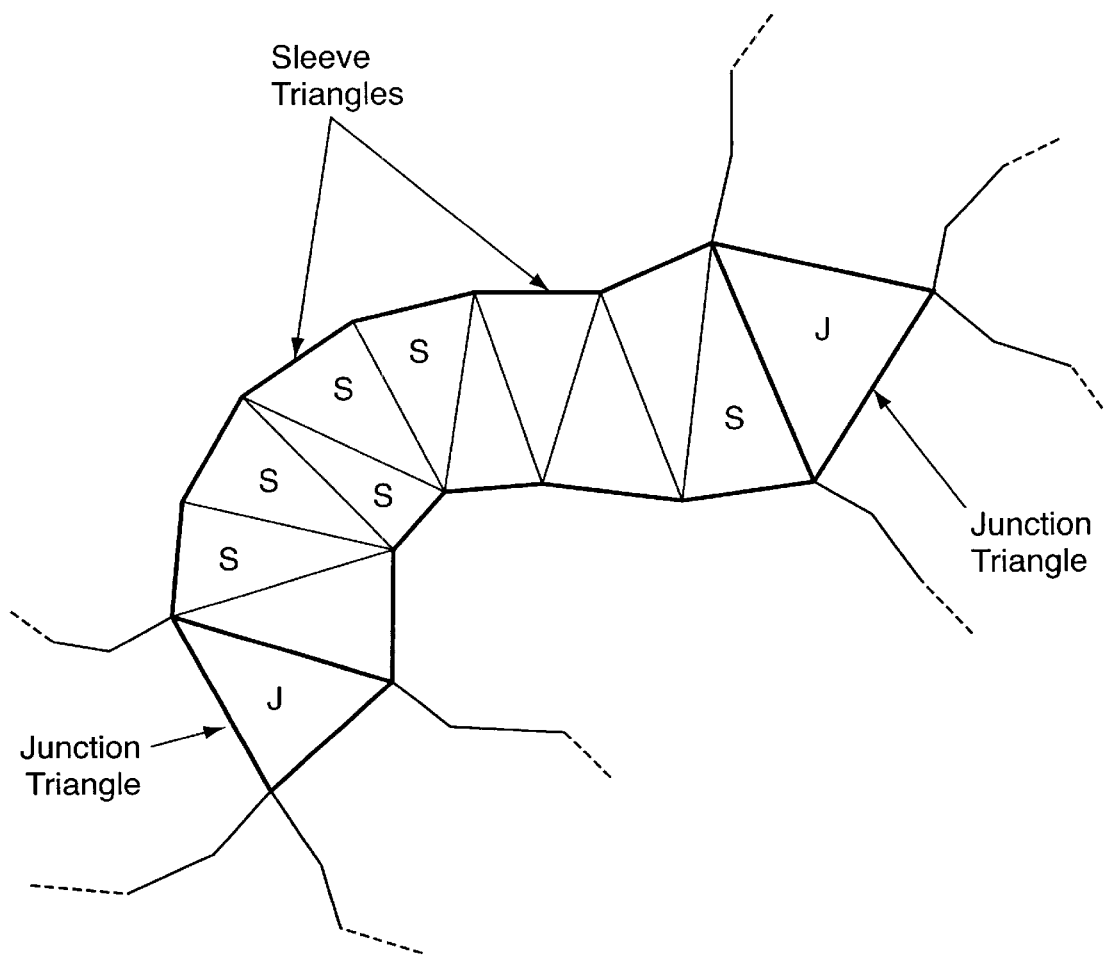

Definition 5: A torso τ is a chain complex of pairwise adjacent triangles, of the form JS ... SJ. (See FIG. 6B)

The J-triangles at the ends of a torso may be the same triangle (as in the case of loops or handles). Again, the number of sleeve triangles in a torso is allowed to be zero; thus, the duo JJ also defines a torso.

The number of limbs $N(\lambda)$ in any polygon with respect to any triangulation is given by $$N(\lambda) = \Delta T + \min(\Delta J, 1) - 1$$

and the corresponding number of torsos $N(\tau)$ is given by $$N(\tau) = |3\Delta J - \Delta T|/2$$

The first relation can be rewritten to obtain a formula for the number of holes g in a polygonal shape as well $$g = (\Delta J - \Delta T)/2 + 1$$

Note that these formulae do not involve numbers of S-triangles. This is because S-triangles are not the sites of important morphological events (i.e., bifurcations or terminations); they serve to merely fill up the space between morphological transitions.

For a given polygon, the numbers $N(\lambda)$ and $N(\tau)$ vary, in general with the triangulation of the polygon, as do the numbers $\Delta J$ and $\Delta T$ (the numbers $\Delta J$ and $\Delta T$ however can vary only in accordance with the first formula, involving the genus of a polygon, which is a topological invariant for a given polygon). However, the formulae for the numbers of limbs and torsos are correct only if the triangulation in question is a Constrained Delaunay Triangulation. In the context of the CDT of a polygon, the above combinatorial formulae have real morphological significance. The limb and torso chain complexes of the CDT of a polygon actually do correspond to morphological limbs and torsos (i.e., trunks connecting branch points) of the polygon's structure. This is an important and novel property of the CDT of a polygon, identified here.

The numbers $\Delta J$ and $\Delta T$ in a CDT of a polygon completely characterize the numbers of all the morphological features of a polygonal shape at the given resolution. These numbers are independent of the particular discretization, so long as the resolution of the discretization of the polygon remains the same.

Using the above identified structures, i.e., limbs and torsos, we can define the discrete CAT of a polygonized shape. The internal edges (i.e., the edges connecting non-adjacent boundary points) of the CDT of a polygonized shape will also be termed maximal chords (and loosely refered to as "chords"). This is because they are the direct discrete analogs of the maximal chords determining the CATs of shapes with continuous boundaries. The midpoints of chords along with half their lengths will constitute ordered pairs $(p,\delta)$, as before, and will be the elements constituting the CAT of a polygonized shape.

The vertex opposite the internal edge of a terminal triangle, along with the length of (either) one of the external edges incident upon it will constitute a special ordered pair of the form $(p,-\delta)$—a terminal ordered pair. Here p is the vertex (represented by its pair of coordinates,) and δ is the length of one of the external (boundary) edges incident upon it. The negative sign in front of δ just serves to distinguish this type of ordered pair from the others, and has no computational use or significance.

Two ordered pairs corresponding to the adjacent sides of the same triangle are called adjacent pairs. Each adjacent pair defines a unique triangle, and each S-triangle is defined by a unique adjacent pair. The discrete CAT of a polygonized shape is then a list of sequences of ordered pairs, wherein each sequence characterizes a limb or a torso of the shape:

Definition 6: The discrete Chordal Axis Transform of a polygonized shape is the list of all sequences, of length at least 3, of ordered pairs $(p, \delta)$ obtained from the CDT of the shape of the form $[(p_1,-\delta_1),(p_2,\delta_2), \ldots,(p_{n-1},\delta_{n-1}),(p_n,\delta_n)]$ (corresponding to a limb) or of the form $[(p_1,\delta_1),(p_2,\delta_2), \ldots,(p_{n-1},\delta_{n-1}),(p_n,\delta_n)]$ (corresponding to a torso) such that, in each sequence i) each ordered pair $(p_i,\delta_i)(1<i<n)$ occurs exactly once ii) $(p_i,\delta_i)$ and $(p_{i+1},\delta_{i+1})$ $(1 \le i<n)$ are adjacent pairs iii) no two adjacent pairs define the same triangle, unless that triangle is a J-triangle and $(p_2,\delta_2) \ne (p_{n-1},\delta_{n-1})$ iv) the adjacentpairs $(p_1,\delta_1)$, $(p_2,\delta_2)$ and $(p_{n-1},\delta_{n-1})$, $(p_n, \delta_n)$ both define J-triangles (which may be the same triangle, as in the case of loops)

v) $(p_1,-\delta_1)$ is a terminal ordered pair that occurs only at the beginning of a sequence, characterizing a limb.

The above definition of the discrete CAT of a polygonal shape completely characterizes the shape. Indeed, as described below, it is possible to recover the polygonal shape, exactly, from its CAT. In fact, not only is it possible to recover the shape completely but also one can reconstruct the CDT of the shape from its CAT. The discrete CAT and its ability to segment a polygonal shape into limbs and torsos is displayed geometrically by joining $p_i$ and $p_{i+1}$, whenever the adjacent pair $(p_i,\delta_i)$ and $(p_{i+1},\delta_{i+1})$ define an S-triangle (see FIGS. 7D & 7E).

The CAT Skeleton

It is possible to construct a one dimensional retract of the polygonal shape that has the same connectivity as the shape and serves as the local axis of symmetry of the shape, namely its skeleton. A brief outline of the algorithm for constructing the skeleton of a polygonal shape from its CAT is given below:

1. Join $p_i$ and $p_{i+1}$, by a straight line segment whenever the adjacent pair $(p_i,\delta_i)$ and $(p_{i+1},\delta_{i+1})$ define an S-triangle (i.e., whenever $2 \le i \le n-2$)

2. In each of the J-triangles determined by the adjacent pairs $(p_1,\delta_1)$, $(p_2,\delta_2)$ and $(p_{n-1},\delta_{n-1})$, $(p_n,\delta_n)$ of a sequence in the CAT, do the following:

i. join the midpoints of the sides of the J-triangle to its circumcenter (the intersection of the perpendicular bisectors of the sides of the triangle) if the triangle is acute (i.e., if the circumcenter lies inside the triangle);

ii. join the midpoint of the longest side of the triangle to the midpoints of the other two sides if the triangle is not acute (i.e., if the circumcenter lies outside the triangle.

To accomplish step 2 above, it is necessary to obtain the vertices of the J-triangles. In the case of the J-triangle corresponding to the adjacent pair $(p_1,\delta_1)$, $(p_2,\delta_2)$, it is possible to do so by using the other ordered pair adjacent to $(p_2,\delta_2)$, namely $(p_3,\delta_3)$. This procedure will be explained later in detail in the context of polygonal shape reconstruction from its CAT. The same applies for the J-triangle corresponding to the adjacent pair $(p_{n-1},\delta_{n-1})$, $(p_n,\delta_n)$; i.e., the triangle vertices can be recovered using the ordered pair $(p_{n-2},\delta_{n-2})$.

The discrete CAT, and the subsequent CAT skeleton of the polygonal approximation of a shape, obtained from its CDT, is shown in FIGS. 7A–7F using the continuous contour of the hand-written letter "r" 60 shown in FIG. 7A:

15

1. A Haar wavelet transform produces a discretized representation 62 shown in FIG. 7B.
2. A CDT 64 is formed of the discretized representation, shown in FIG. 7C.
3. In each S-triangle, the line segment joining the midpoints of its internal edges is drawn, FIG. 7D. A chain of pairwise adjacent S-triangles in the CDT, forming the sleeve of a limb of the polygon, will correspond to a contiguous chain of line segments in the CAT of the polygon.
4. The resulting segmentation of the shape's structure obtained by the CAT is shown in FIG. 7E
5. The midpoints of the smaller sides of the only J-triangle are joined by line segments to the midpoint of the longest side (this is because this triangle is not acute-angled) to produce a connected CAT skeleton that reflects the shape's overall structure, as shown in FIG. 7F

The CAT skeleton of a shape satisfies all the requirements established for a skeleton. One can also obtain an approximation of the MAT for polygonal approximations of a shape, by joining the circumcenters of adjacent triangles in the CDT of the approximating polygon by straight line segments. However, in addition to all the shortcomings of the MAT discussed earlier, this approximation fails to reflect the polygon's structure at coarse approximations, as it is unstable to sparse discretization of the shape boundary and crosses the boundary of the shape.

Inversion of the CAT of a Polygonal Shape

A brief outline of the basic steps of the algorithm to recover the boundary of a polygonal shape from its CAT is given here, with the understanding that many improvements and optimizations are possible.

For the purposes of inversion, it is necessary to only consider sequences of the CAT that are limbs, and torso sequences that have length greater than three. In other words, only those sequences that contain adjacent pairs corresponding to sleeve triangles or terminal ordered pairs need be considered. This is because only terminal and sleeve triangles share edges with the polygonal boundary. In any such sequence it is sufficient to describe how the span (i.e., the subtending boundary points of a maximal chord) of any ordered pair $(p_i, \delta_i)$ (1<i<n) may be recovered.

Figure 11:
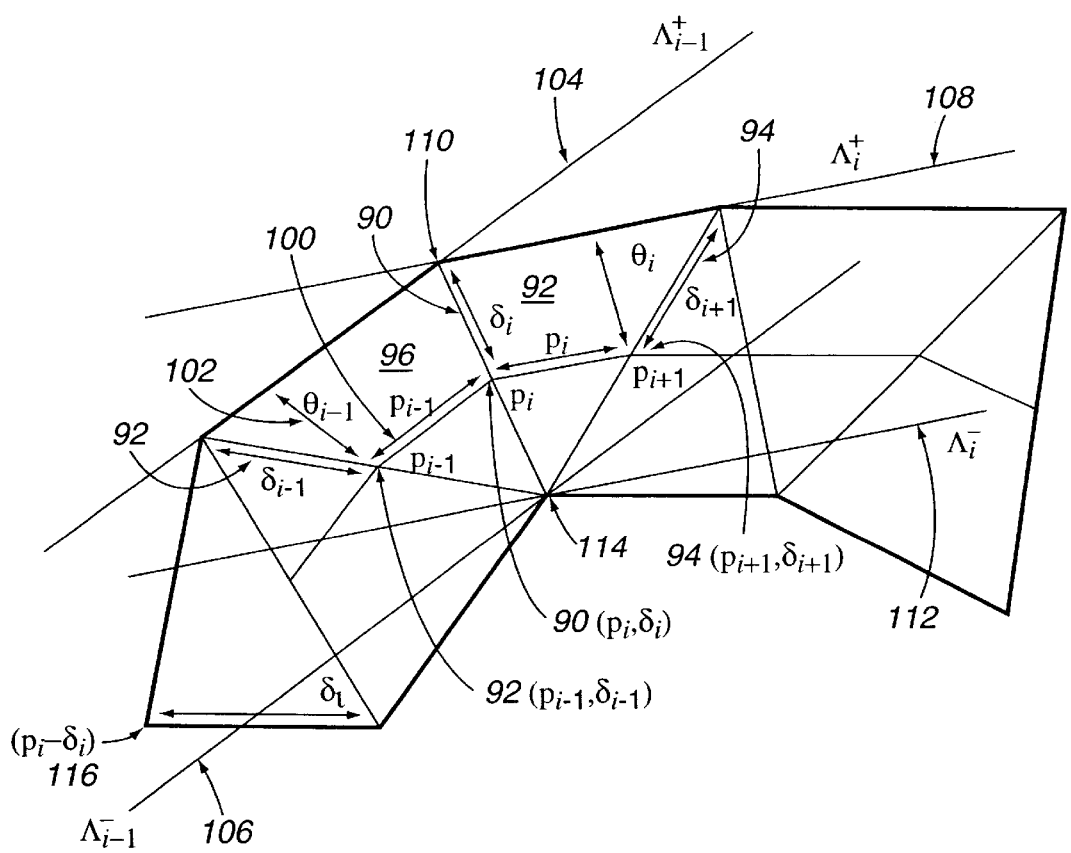
FIG. 11 illustrates the recovery of a polygonal shape from its CAT.

To this effect, with reference to FIG. 11, consider the ordered pair $(p_i, \delta_i)$ 90 along with its adjacent ordered pairs $(p_{-1}, \delta_{i-1})$ 92 and $(p_{i+1}, \delta_{i+1})$ 94. Let $\Delta_{i-1}$ 96 be the triangle corresponding to the adjacent pair $(p_{i-1}, \delta_{i-1})$, $(p_i, \delta_i)$, and let $\Delta_i$ 98 be the triangle corresponding to the adjacent pair $(p_i, \delta_i)$, $(p_{i+1}, \delta_{i+1})$. If the distance $d(p_{i-1}, p_i)$ between the points $p_{i-1}$ and $p_i$ is denoted $\rho_{i-1}$ 100, then half the height of the triangle $\Delta_{i-1}$ is given by $$\theta_{i-1} = \sqrt{[(\delta_{i-1}+\delta_i+\rho_{i-1})(\delta_{i-1}+\delta_i-\rho_{i-1})(\delta_{i-1}-\delta_i+\rho_{i-1})(\delta_i-\delta_{i-1}+\rho_{i-1})]} / 4\rho_{i-1}$$

If $\mu_{i-1}$ is the slope of the straight line $\Lambda_{i-1}$ passing through $p_{i-1}$ and $p_i$, then the two straight lines, $\Lambda_{i-1}^+$ 104 and $\Lambda_{i-1}^-$ 106, parallel to the line $\Lambda_{i-1}$ and at a distance $\theta_{i-1}$ 102 on either side of it, are given by $$\Lambda_{i-1}^+ - y = \mu_{i-1}x + C_{i-1} + \theta_{i-1}\sqrt{(1+\mu_{i-1}\mu_{i-1})}$$

and $$\Lambda_{i-1}^- - y = \mu_{i-1}x + C_{i-1} - \theta_{i-1}\sqrt{(1+\mu_{i-1}\mu_{i-1})}$$

16 where $$\Lambda_{i-1} - y = \mu_{i-1}x + C_{i-1}$$

is the equation of the straight line passing through $p_{i-1}$ and $p_i$.

Similar definitions and equations can be set forth for the adjacent pair $(p_i, \delta_i)$, $(p_{i+1}, \delta_{i+1})$.

The intersection of the lines $\Lambda_{i-1}^+$ and $\Lambda_i^+$ 108 yields the boundary point $b_i^+$, 110 and, similarly, the intersection of the lines $\Lambda_{i-1}^-$ and $\Lambda_i^-$ 112 yields the boundary point $b_i^-$ 114. The pair $b_i^+$, $b_i^-$ form the span of the ordered pair $(p_i, \delta_i)$. Thus, two sequences of pairwise adjacent boundary vertices are generated:

$$\{b_2^+, \ldots b_{n-1}^+\} \text{ and } \{b_2^-, \ldots b_{n-1}^-\}$$

Some vertices in each of the above sequences appear a multiplicity of times successively. This is because consecutive intersection points of lines sometimes coincide. This multiplicity is resolved by retaining only one copy of each vertex.

In the case the sequence of ordered pairs corresponds to a limb (this is signified by the first ordered pair being a terminal ordered pair represented by $(p_1, \delta_1)$ 116, the vertex $p_1$ 116 is the common boundary neighbor of the vertices $b_2^+$ and $b_2^-$. Thus, for a limb sequence, a single contiguous chain of pairwise adjacent polygonal boundary vertices, given by $\{b_{n-1}^-, \ldots, b_2^-, p_1, b_2^+, \ldots, b_{n-1}^+\}$ is obtained, whereas for a torso sequence two disjoint contiguous chains of boundary vertices are obtained. When two boundary vertices of two distinct CAT sequences coincide, they are taken to be the same vertex and the boundary vertex sequences are merged at this vertex. Performing the above constructions for all limb sequences, and for all torso sequences of length greater than 3 in the CAT of a polygonal shape, all the boundary vertices of the polygonal shape along with adjacency relations are obtained.

The above constitutes a brief description of the salient steps of the inversion algorithm for the discrete CAT of a polygonal shape.

Pruning of Polygonized Shapes and their Skeletons

Figure 8:
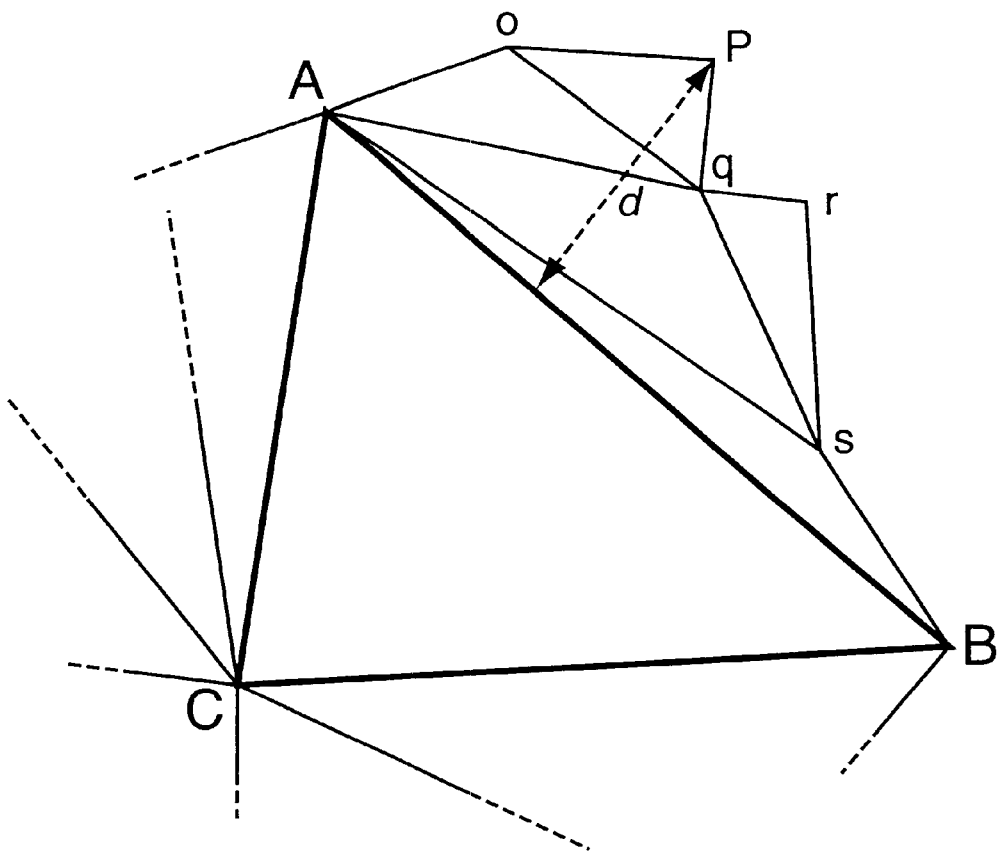
FIG. 8 illustrates a method for pruning less significant features of a shape.

When the boundary of a shape is densely sampled to include noise or minor undulations, the skeleton of the resulting approximating polygon contains branches that are not morphologically significant. The shape and its skeleton can be further pruned to isolate its prominent morphological features. This technique removes branches by ignoring, for the purposes of skeletonization, minor local boundary features in the CAT where the features do not contribute significantly to the characterization of the overall shape. In the CDT of an approximating polygon, each side of a J-triangle subtends a chain of polygonal vertices that does not include the vertex of the J-triangle opposite to this side. The ratio of morphological significance $\rho = d/|AB|$, of the distance d between the furthest point p of the chain from the side AB, of the junction triangle ABC, is a quantitative indication of the importance of the portion AopqrsBA in describing the overall shape (FIG. 8). Whenever a part of a shape (subtended by an edge of a J-triangle) is morphologically insignificant, i.e., whenever $\rho$ is less than some threshold, the part is excised from the shape. The edge subtending the excised part becomes part of the new polygonal boundary (i.e., A and B become neighboring boundary vertices of the modified polygon), while the J-triangle to which the edge belongs becomes an S-triangle. This results in a simplified shape that still represents the salient features of the original shape. Accordingly, the new shape's skeleton does not reflect the morphologically insignificant branches associated with the excised part of the shape. This process of pruning a shape can also be incorporated directly into the CAT of the shape, since the CAT contains all the information about the shape.

Weighted Graph Representation of Shape Features

The essential structural features and characteristics of a polygonized shape may be abstracted and represented in a coordinate independent manner by means of Edge Weighted Graphs. A graph G consists of a set V of nodes, and a set E of edges, wherein each edge connects two (possibly same) nodes of the set V. The graph is edge weighted when each edge is given a weight signifying a property or attribute of the connection. In general, these weights could be n-tuples or vectors characterizing several distinct attributes of the edge. A graph is said to be planar if it can be represented (embedded) in the plane without its edges crossing one another. It is claimed herein that a polygonized shape can be represented by an edge weighted planar graph with vector edge weights, such that the essential topology and vital statistics of the shape are succinctly captured by the graph. Moreover, this representation of shapes is invariant under a wide range of transformations on the shape itself; in particular the representation is invariant under affine transformations such as translation, rotation, scaling and skewing. Also, the size of the graph representation depends only on the structural complexity (i.e., the number of limbs, torsos, junctions and terminations) of the shape, and not on the particular mode of representation of the shape itself. This is a very important feature in terms of achieving highly economical representation and encoding of shape information. Thus, the graph yields an invariant and semantic representation of shape information. The following is an algorithm to obtain the weighted graph representation of a polygonized shape from its CDT:

For a polygonized shape P 120 (see FIG. 12), let CDT(P) denote the set of all triangles in its CDT. Let Gw(P) denote the weighted planar graph associated with P, with node set V and edge set E.

Let each node in V correspond uniquely to a terminal triangle or a junction triangle in CDT(P). Conversely, let each junction and each terminal triangle in CDT(P) correspond uniquely to a node 122 in V. Thus, there is a one-to-one correspondence between the nodes of V and the set of junction and terminal triangles of CDT(P); the size, $|V|$, of V is $(\Delta J + \Delta T)$.

If TS . . . SJ is a limb in the CAT of P, then an edge 124 in E joining the two nodes in V corresponding to the terminal triangle T and the junction triangle J of the limb is introduced. Similarly, if JS . . . SJ is a torso in the CAT of P, then an edge 126 in E joining the two nodes in V corresponding to the two junction triangles J of the torso is introduced. The size, $|E|$, of E is $(N(\lambda)+N(\tau))$. The resulting graph is planar since it has the same topology as the skeleton 128 of P, which has non-overlapping branches.

If $[(p_1,-\delta_1),(p_2,\delta_2), \ldots ,(p_{n-1},\delta_{n-1},(p_n,-\delta_n)]$ is a limb sequence corresponding to the limb TS . . . SJ in the CAT of P, the length l of this limb is taken to be $$l = \sum_{2 \le i \le n-2} \rho_i$$

where $\rho_i = d(p_{i-1}, p_i)$, as before.

The width w of the limb is taken to be $$w = 2 \left( \sum_{2 \le i \le n-2} \theta_i \cdot \rho_i \right) / \sum_{2 \le i \le n-2} \rho_i$$

where $\theta_i$ is, as before, half the height of the triangle defined by the adjacent pair $(p_i,\delta_i),(p_{i+1},\delta_{i+1})$.

The variance of the heights is taken as another attribute of the limb to indicate the variation in the width of the limb along its length:

$$v = 4 \left( \sum_{2 \le i \le n-2} (\theta_{i-w}) \cdot (\theta_{i-w}) \cdot \rho_i \right) / \sum_{2 \le i \le n-2} \rho_i$$

The weight vector $\overline{w}$ 130 for the edge joining the nodes corresponding to the T and J triangles of the above limb TS . . . SJ is then taken to be $$\overline{w}=(l,w,v)$$

A similar computation of the weight vector is performed for graph edges representing torsos.

For limbs and torsos that do not have sleeve triangles (i.e., the limbs and torsos have only two triangles in them) the width of the common edge between the triangles is taken to be the width w of the member. The variance v is set to zero. The length l is taken to be the distance between the circumcenter (or the midpoint of the longest side if the triangle is obtuse) of the junction triangle to that of the other junction (or terminal, in the case of a limb) triangle.

The individual components of all the weights of the graph Gw(P) may then separately or jointly normalized with respect to the largest weight in the graph. This renders the representation scale-invariant.

The number of components of the weight vector may be increased to include other higher order statistics or other properties of limbs and torsos, as the application at hand might dictate.

The above then constitutes an algorithm for obtaining a graph representation of shapes.

This representation along with the enumerations of graph components may then be used for matching and comparing shapes using weighted graph matching algorithms. The above method thus paves a way for performing performing pattern matching and shape recognition at a high level for applications in computer vision and robotics.

Thus, the above description of the invention has been directed to the following aspect of the invention.

1. An adaptive multiscale method for approximating shapes with continuous or uniformly and densely sampled contours, with the purpose of sparsely and nonuniformly discretizing the boundaries of shapes at any prescribed resolution, while at the same time retaining the salient shape features at that resolution. This method can be used for reduced representation, denoising, and discretization of shapes. This has important applications in Computer Vision, Image Analysis and Image Understanding.

2. A fundamental geometric filtering scheme using the Constrained Delaunay Triangulation (CDT) of polygonized shapes that creates a paradigm for semantic and anthropocentric segmentation and analysis of shape data into morphologically meaningful components. The resultant efficient parsing of shapes into components that have semantic significance dependent only on the shapes' structure and not on their representations per se, is a profound contribution to Computer Vision and related areas. This has far reaching implications and applications to artificial vision, machine intelligence and pattern analysis. In particular, the transition from a syntactic representation of a shape by means of its contour points to a semantic representation in terms of its morphological components, via the Chordal Axis Transform (CAT), provides a means of computing with shapes and understanding their features.

3. A shape skeletonization process that generalizes to sparsely discretized shapes, with the additional benefit of prunability to filter out irrelevant and morphologically insignificant features. This has important applications to the automated recognition of printed and handwritten characters and numerals. The skeletal representation of characters of varying thicknesses and the elimination of insignificant and noisy spurs and branches from the skeleton greatly increases the robustness, reliability and recognition rates of character recognition algorithms.

4. A method of abstraction and representation of shape features in an invariant and semantic manner to generate efficient graph representation of shapes and their features. In this form, shapes are highly amenable to comparison and recognition at an unprecedented level of semantic abstraction. This is key to the implementation and realization of practical systems in Robotic Vision and Artificial Intelligence.

5. An end-to-end process that, starting from a densely sampled or continuous shape contour achieves semantic shape feature extraction and abstraction to yield a high-level morphological representation of shape information in the computationally amenable and efficient form of a weighted graph. This comprehensive process is a fundamental procedure that enables intelligent processing of visual data, and when coupled with other preprocessing techniques, has the potential of yielding an intelligent vision system. A schematic flow of such a process is envisaged in FIG. 13.

The described invention has direct and immediate applications to the following problems and areas:
  i. Computer Vision
  ii. Pattern Analysis
  iii. Artificial Intelligence
  iv. Document Analysis
  v. Optical Character Recognition
  vi. Biometric Analysis
  vii. Robotic Navigation
  viii. Fingerprint Recognition
  ix. Structural Analysis of Composite Materials
  x. Remote Surveillance
  xi. Content-based Image and Text Data Retrieval The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer implemented method for determining a skeletonized representation of a shape having a boundary comprising the steps of:

forming a set of maximal discs within the boundary of the shape;

determining maximal chords of tangency for each maximal disc in the set of maximal discs;

determining a set of all ordered pairs (p,δ) of the maximal chords of tangency, where p and δ are the midpoint and half the length, respectively, of each maximal chord of tangency of the maximal discs that are tangent to the shape at exactly two points;

determining a set of unordered triples of the ordered pairs of maximal chords of tangency of the maximal discs that are tangent to the shape at exactly three points;

successively connecting the midpoints of adjacent maximal chords of tangency of the maximal discs to form a skeletal feature that terminates at a terminal maximal chord of tangency of a maximal disc that is tangent to the shape at exactly three points; and connecting the skeletal features by joining the midpoints of the maximal chords of a maximal disc with three maximal chords with the center of the maximal disc if the maximal chords form an acute angled triangle, or to the midpoint of the longest of the three chords so that a connected skeletal representation of the shape is formed.

2. A computer implemented method according to claim 1, further including the step of pruning the skeletal representation by not connecting the midpoint of a terminal maximal chord of tangency to eliminate an associated shape feature.

3. A computer implemented method for determining a skeletonized representation of a shape having a boundary comprising the steps of:

forming a discretized multi-scale representation of a shape using a Haar wavaelet tranform;

forming a Constrained Delaunay Triangulation (CDT) of the discretized representation to define termination triangles (T-triangles) having two external edges and one internal edge, sleeve triangles (S-triangles) having one external edge and two external edges, and junction triangles (J-triangles) having no external edges and three internal edges;

for each S-triangle, form a line segment connecting midpoints of its two internal edges, wherein the line segments of adjacent S-triangles form a continuous chain of line segments that terminate at an internal edge of a T-triangle or a J-triangle;

for each J-triangle, form line segments connecting a midpoint of each smaller triangle side to a midpoint of the longest side so that a connected skeletal representation of the shape is obtained.

4. A computer implemented method according to claim 3, further including the step of pruning the connected skeletal representation to delete limbs having a morphological significance below a threshold value.

5. A computer implemented method for characterizing a shape comprising the steps of:

forming a Constrained Delauney Triangulation (CDT) polygonal representation of the shape having morphological features;

characterizing each triangle of the CDT as a termination triangle (T-triangle) having two external edges, a sleeve triangle (S-triangle) having two external edges, or a junction triangle (J-triangle) having no external edges; and counting the number of T-triangles and the number of S-triangles to completely characterize the morphological features of the CDT polygonal representation.

* * * * *